United States Patent
Kamihara et al.

(10) Patent No.: US 9,776,732 B2
(45) Date of Patent: Oct. 3, 2017

(54) STRUCTURAL MATERIAL FOR STRUCTURE, FUEL TANK, MAIN WING, AND AIRCRAFT

(71) Applicant: MITSUBISHI HEAVY INDUSTRIES, LTD., Minato-ku, Tokyo (JP)

(72) Inventors: Nobuyuki Kamihara, Tokyo (JP); Toshio Abe, Tokyo (JP); Akihisa Okuda, Tokyo (JP); Akira Ikada, Tokyo (JP); Masayuki Yamashita, Tokyo (JP); Kazuaki Kishimoto, Tokyo (JP); Yuichiro Kamino, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 249 days.

(21) Appl. No.: 14/434,553

(22) PCT Filed: Oct. 9, 2013

(86) PCT No.: PCT/JP2013/077434
§ 371 (c)(1),
(2) Date: Apr. 9, 2015

(87) PCT Pub. No.: WO2014/057960
PCT Pub. Date: Apr. 17, 2014

(65) Prior Publication Data
US 2015/0274316 A1    Oct. 1, 2015

(30) Foreign Application Priority Data

Oct. 9, 2012 (JP) .................................. 2012-224141

(51) Int. Cl.
*B64D 45/02* (2006.01)
*B64C 3/34* (2006.01)
(Continued)

(52) U.S. Cl.
CPC ................. *B64D 45/02* (2013.01); *B64C 3/34* (2013.01); *B64D 37/04* (2013.01); *B64D 37/08* (2013.01);
(Continued)

(58) Field of Classification Search
None
See application file for complete search history.

(56) References Cited

U.S. PATENT DOCUMENTS 4,556,591 A * 12/1985 Bannink, Jr. ......... B29C 65/601
244/1 A
4,755,904 A * 7/1988 Brick .................... B64D 45/02
244/1 A
(Continued)

FOREIGN PATENT DOCUMENTS

CN    101466598 A    6/2009
CN    101501114 A    8/2009
(Continued)

OTHER PUBLICATIONS

Office Action in CN Application No. 201380048718.1, mailed Aug. 22, 2016.
(Continued)

*Primary Examiner* — Medhat Badawi
(74) *Attorney, Agent, or Firm* — Kanesaka Berner and Partners LLP

(57) ABSTRACT

The purpose of the present invention is to provide: a structural material for structures which is capable of attaining reductions in working time and cost in production steps and of preventing an increase in weight; a fuel tank; a main wing; and an aircraft. A rib (11) as the structural material for structures is characterized by comprising a carbon-fiber-reinforced plastic wherein the reinforcement comprises carbon fibers and the matrix comprises a plastic, and the surface (Continued)

of the carbon-fiber-reinforced plastic was coated with a low-viscosity surface-protective material (18) having conductivity imparted thereto.

5 Claims, 4 Drawing Sheets

(51) Int. Cl.
  *B64D 37/08* (2006.01)
  *B64D 37/04* (2006.01)
  *C08J 5/04* (2006.01)
  *C08J 7/04* (2006.01)

(52) U.S. Cl.
  CPC .............. *C08J 5/042* (2013.01); *C08J 7/047* (2013.01); *C08J 2300/00* (2013.01); *C08J 2363/00* (2013.01); *C08J 2367/06* (2013.01); *C08J 2400/12* (2013.01); *Y02T 50/44* (2013.01); *Y10T 428/31511* (2015.04); *Y10T 428/31786* (2015.04)

(56) References Cited

U.S. PATENT DOCUMENTS

| | | | | |
|---|---|---|---|---|
| 5,855,272 A * | 1/1999 | Symons | ............ | G11B 33/1486 206/213.1 |
| 5,866,272 A * | 2/1999 | Westre | ............ | B32B 3/12 244/119 |
| 6,086,975 A * | 7/2000 | Brick | ............ | B32B 3/12 244/121 |
| 6,327,132 B1 * | 12/2001 | Andrivet | ............ | B29C 70/885 244/1 A |
| 2005/0175813 A1 * | 8/2005 | Wingert | ............ | B32B 15/14 428/113 |
| 2008/0012681 A1 * | 1/2008 | Kadar | ............ | H01H 77/04 337/298 |
| 2008/0137259 A1 * | 6/2008 | Heeter | ............ | B64D 37/32 361/218 |
| 2008/0295955 A1 * | 12/2008 | Cawse | ............ | B32B 5/22 156/276 |
| 2009/0227162 A1 * | 9/2009 | Kruckenberg | ........ | B64D 45/02 442/1 |
| 2010/0061031 A1 * | 3/2010 | Lopez-Reina Torrijos | ............ | B29C 70/885 361/218 |
| 2010/0178487 A1 * | 7/2010 | Arai | ............ | C08J 5/24 428/300.1 |
| 2011/0008587 A1 * | 1/2011 | Ruskin | ............ | B64F 5/10 428/192 |
| 2011/0284694 A1 * | 11/2011 | Yamaguchi | ............ | B64C 3/34 244/135 R |
| 2011/0297315 A1 * | 12/2011 | Kishida | ............ | B32B 27/04 156/324 |
| 2011/0297790 A1 * | 12/2011 | Yamaguchi | ............ | B64C 3/34 244/135 R |
| 2012/0012710 A1 * | 1/2012 | Yamaguchi | ............ | B64D 37/32 244/135 R |
| 2013/0319750 A1 * | 12/2013 | Waku | ............ | B29C 70/882 174/264 |
| 2016/0229552 A1 * | 8/2016 | Gross | ............ | B22F 7/062 |

FOREIGN PATENT DOCUMENTS

| | | |
|---|---|---|
| CN | 101588919 A | 11/2009 |
| CN | 101984009 A | 3/2011 |
| JP | 2-63725 A | 3/1990 |
| JP | 6-16846 A | 1/1994 |
| JP | 7-96579 A | 4/1995 |
| JP | 11-138669 A | 5/1999 |
| JP | 2003-154591 A | 5/2003 |
| JP | 2007-301838 A | 11/2007 |
| JP | 2010-194749 A | 9/2010 |
| JP | 2010-280904 A | 12/2010 |
| JP | 2011-168792 A | 9/2011 |
| RU | 2381242 C2 | 2/2010 |
| WO | 2012/111704 A1 | 8/2012 |

OTHER PUBLICATIONS

Notice of Allowance in CA Application No. 2885204, dated Oct. 20, 2016.
International Search Report and Written Opinion mailed Jan. 7, 2014 in International Application No. PCT/JP2013/077434.
Decision on Patent Grant for Invention in RU Patent Application No. 2015109128, mailed Aug. 4, 2016.

* cited by examiner

STRUCTURAL MATERIAL FOR STRUCTURE, FUEL TANK, MAIN WING, AND AIRCRAFT

RELATED APPLICATIONS

The present application is a National Phase of International Application Number PCT/JP2013/077434, filed Oct. 9, 2013, which claims priority to Japanese Application Number 2012-224141, filed Oct. 9, 2012.

TECHNICAL FIELD

The present invention relates to a structural material for structures that uses carbon-fiber-reinforced plastic, a fuel tank, a main wing, and an aircraft.

BACKGROUND ART

A main wing of an aircraft may be used as a fuel tank capable of storing fuel. A fuel tank that forms an integral part of the main wing, the wing structure having a liquid-tight structure that prevents fuel leakage, is referred to as an integral tank. Composite materials such as carbon-fiber-reinforced plastic (CFRP) tend to be used for integral tanks with the goal of reducing weight. In CFRP, carbon fibers are used as a reinforcing material, and a synthetic resin is used as a matrix.

Patent Document 1 discloses an invention of a three-dimensional fiber-reinforced resin composite material in which selvage threads are formed from an electrically conductive material having a higher level of electrical conductivity than in-plane directional threads in order to impart the fiber-reinforced resin composite material with electrical conductivity without reducing productivity. Patent Document 2 discloses an invention of a prepreg and a carbon-fiber-reinforced composite material in which electrically conductive particles or fibers are included in order to provide both superior impact resistance and electrical conductivity. Patent Document 3 discloses an invention of an improved composite material that contains electrically conductive particles dispersed within a polymer resin in order to impart electrical conductivity while substantially or entirely avoiding increased weight over a standard composite material.

CITATION LIST

Patent Literatures

Patent Document 1: Japanese Unexamined Patent Application Publication No. 2007-301838A
Patent Document 2: Japanese Unexamined Patent Application Publication No. 2010-280904A
Patent Document 3: Japanese Unexamined Patent Application Publication No. 2011-168792A

SUMMARY OF INVENTION

Technical Problem

However, when CFRP is used in a fuel tank of an aircraft, the microscopic ends of the carbon fibers are exposed to the interior the fuel tank at surfaces of the CFRP article, especially, cut surfaces formed by cutting.

In such cases, there is a risk of electrical discharge between the carbon fibers occurring at the ends of the carbon fibers when the main wing is struck by lightning and electrical current flows through the surfaces or cut surfaces of the CFRP article. One method of countering such discharge is to apply a sealant or the like to the surfaces or cut surfaces of the CFRP article, sealing sparks generated by electrical discharge within the interior. However, the sealant must be suitably thick in order to seal sparks generated by electrical discharge, increasing working time and cost of the process of manufacturing the fuel tank. In addition, the thickly applied sealant increases the weight of the main wing.

In addition, in methods involving the application of sealant, strict quality control of the thickness of the sealant is necessary once the predetermined sealant thickness has been obtained in order to yield spark sealing performance. This can greatly increase quality inspection time or costs.

The present invention was conceived in view of the circumstances described above, and has an object of providing a structural material for structures that is capable of yielding reductions in working time and cost during the manufacturing process and preventing increases in weight; a fuel tank; a main wing; and an aircraft.

Solution to Problem

In order to solve the problems described above, the structural material for structures, fuel tank, main wing, and aircraft of the present invention utilize the following means.

That is, a structural material for structures according to the present invention includes carbon-fiber-reinforced plastic in which a reinforcing material includes carbon fibers and a matrix includes a plastic, wherein a low-viscosity surface-protective material imparted with electrical conductivity is applied to the surface of the carbon-fiber-reinforced plastic.

In accordance with this invention, a reinforcing material of the carbon-fiber-reinforced plastic includes carbon fibers and a matrix thereof includes a plastic, and the surface-protective material applied to the surface of the carbon-fiber-reinforced plastic is imparted with electrical conductivity and has low viscosity. Because the electrically conductive surface-protective material is applied to the surface, electrical conduction between the ends of the carbon fibers present at the surface is ensured even when electrical current flows therethrough upon being struck by lightning, allowing for the prevention of electrical discharge between the ends of the carbon fibers. In addition, because the surface-protective material is low in viscosity, it is easy to apply, and exhibits high surface bondability. In addition, because the surface-protective material needs only to ensure electrical conduction between the ends of the carbon fibers, unlike a sealant or the like used to seal sparks, the thickness can be less than when a sealant is used, and quality control of the coating thickness can be eased.

In the invention described above, the matrix may be imparted with electrical conductivity.

In accordance with this invention, the matrix of the carbon-fiber-reinforced plastic is imparted with electrical conductivity, ensuring electrical conduction between the reinforcing materials constituted by the carbon fibers, and allowing for the prevention of electrical discharge at the ends of the structural member.

In the invention described above, the volume resistivity may be 0.5 Ωcm or less.

In accordance with this invention, because the volume resistivity of the structural material for structures is 0.5 Ωcm or less, the spark generation current value is higher than cases in which the volume resistivity is high, inhibiting spark generation.

A fuel tank according to the present invention includes the structural material for structures described above, and a coated surface created by applying the surface-protective material to the surface thereof facing the interior, in which fuel is stored.

In accordance with this invention, in the structural material for structures of the fuel tank, even when the coated surface of the surface-protective material faces the interior, in which fuel is stored, because the surface-protective material has been imparted with electrical conductivity, electrical conduction is ensured between the ends of the carbon fibers, allowing for the prevention of electrical discharge at the ends of the carbon-fiber-reinforced plastic.

In a main wing according to the present invention, the fuel tank described above constitutes the structure thereof.

In accordance with this invention, the fuel tank constitutes the structure of the main wing, and the structural material for structures of the fuel tank is carbon-fiber-reinforced plastic. Because the electrically conductive surface-protective material is applied to the surface of the carbon-fiber-reinforced plastic, electrical conduction between the ends of the carbon fibers present at the surface is ensured even when electrical current flows therethrough upon being struck by lightning, allowing for the prevention of electrical discharge between the ends of the carbon fibers.

An aircraft according to the present invention includes the main wing described above.

In accordance with this invention, the fuel tank constitutes the structure of the main wing of the aircraft, and the structural material for structures of the fuel tank is carbon-fiber-reinforced plastic. Because the electrically conductive surface-protective material is applied to the surface of the carbon-fiber-reinforced plastic, electrical conduction between the ends of the carbon fibers present at the surface is ensured even when electrical current flows therethrough upon being struck by lightning, allowing for the prevention of electrical discharge between the ends of the carbon fibers.

Advantageous Effects of Invention

According to the present invention, the surface-protective material applied to the surface of the carbon-fiber-reinforced plastic has been imparted with electrical conductivity, thereby ensuring electrical conduction between the reinforcing materials constituted by the carbon fibers on the surface of the carbon-fiber-reinforced plastic, allowing for the prevention of electrical discharge between the reinforcing materials at the end of a structural member, reducing working time and cost during the manufacturing process, and allowing for the prevention of increases in weight.

DESCRIPTION OF EMBODIMENTS

An embodiment of the present invention will now be described with reference to the drawings.

First, the configuration of a main wing 1 of an aircraft according to the embodiment will be described.

Figure 1:
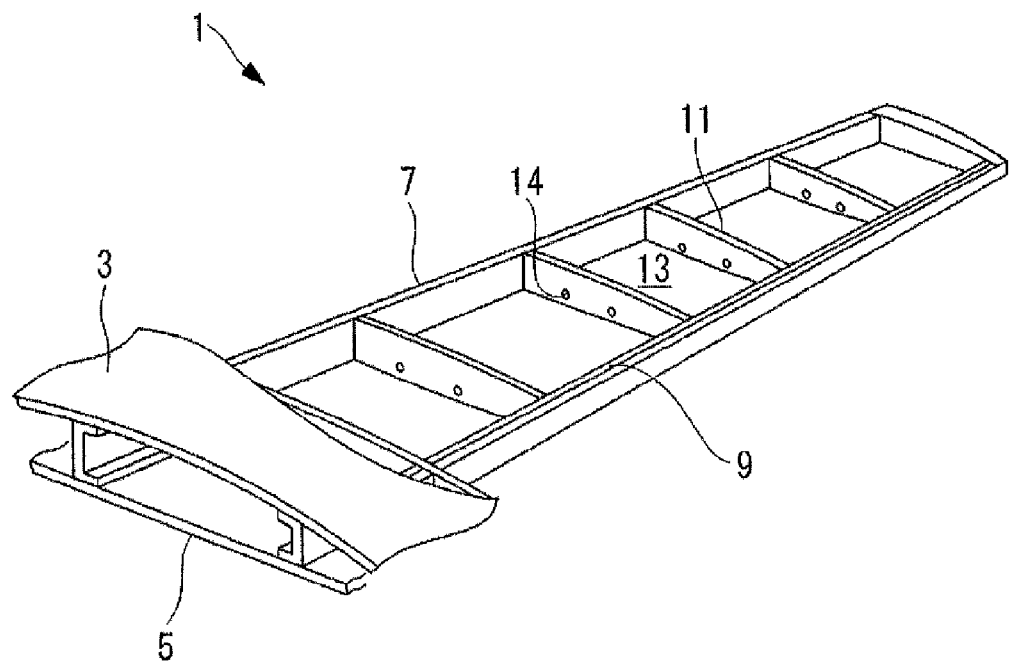
FIG. 1 is a partially cut-away perspective view illustrating a main wing according to an embodiment of the present invention.
Figure 2:
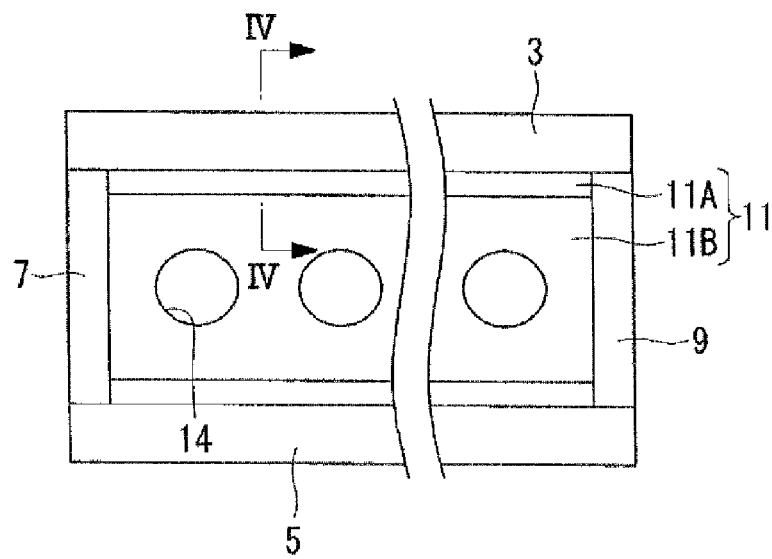
FIG. 2 is a longitudinal cross-sectional view of the main wing according to the same embodiment.

As illustrated in FIGS. 1 and 2, the main wing 1 includes an upper skin 3, a lower skin 5, a forward spar 7, a rear spar 9, a plurality of ribs 11, and the like.

The upper skin 3 and the lower skin 5 constitute the exterior of the main wing 1, and are thin plates also acting as aerodynamic surfaces. The upper skin 3 and the lower skin 5, along with the forward spar 7, the rear spar 9, and stringers (not illustrated) partially bear tensile loads and compressive loads acted on the main wing 1.

As illustrated in FIG. 1, the forward spar 7 and the rear spar 9 are structural members that extend in the lengthwise direction of the main wing 1, and are disposed between the upper skin 3 and the lower skin 5. A plurality of stringers are auxiliary members that extend in the lengthwise direction of the main wing 1 on the inner surface of the upper skin 3 or the lower skin 5 and are disposed between the forward spar 7 and the rear spar 9.

As illustrated in FIG. 1, the ribs 11 are structural members provided in the widthwise direction of the main wing 1, and are disposed between the upper skin 3 and the lower skin 5. Specifically, the ribs 11 are structural members extending in a direction roughly orthogonal to the forward spar 7 and the rear spar 9, and are plate-shaped members formed in the shape of the longitudinal cross-section of the main wing 1. As illustrated in FIGS. 1 and 2, a plurality of openings 14 are formed in the ribs 11 in the longitudinal direction.

In the main wing 1, the section surrounded by the forward spar 7, the rear spar 9, the upper skin 3, and the lower skin 5 is used as a fuel tank 13 in which fuel is stored. The fuel tank 13 is what is known as an integral tank, in which the structure of the aircraft itself is used as a container. The forward spar 7, the rear spar 9, the upper skin 3, the lower skin 5, and the ribs 11 are also structural members of the fuel tank 13. The fuel tank 13 has a liquid-tight structure that prevents fuel from leaking to the exterior.

A fuel pipe (not illustrated) for supplying fuel to the fuel tank 13, a plurality of fuel gauges (not illustrated) for detecting fuel level, wiring (not illustrated) for the fuel gauges, and the like are disposed within the fuel tank 13.

Next, the structural members of the fuel tank 13 will be described.

Figure 3:
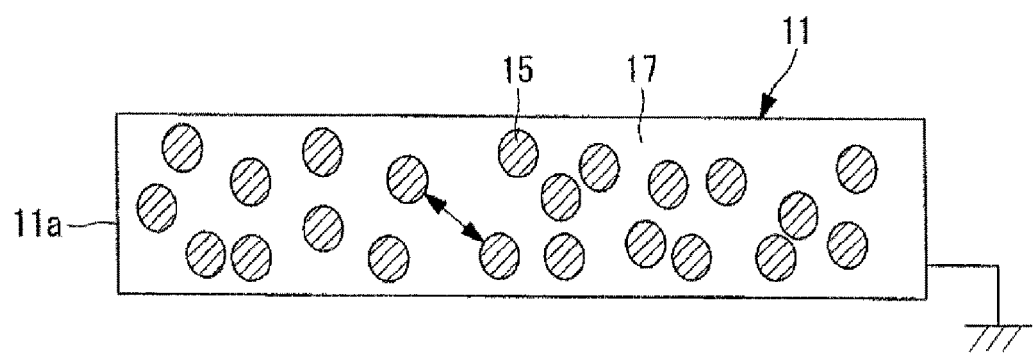
FIG. 3 is an end view of a flange of a rib according to the same embodiment with respect to the arrows in FIG. 5.

Carbon-fiber-reinforced plastic (CFRP) is used for the structural members of the fuel tank 13, i.e., the forward spar 7, the rear spar 9, the upper skin 3, the lower skin 5, and the ribs 11. As illustrated in FIG. 3, a reinforcing material 15 of the CFRP according to the embodiment used for the fuel tank 13 includes carbon fibers, and a matrix 17 thereof includes a plastic. A rib 11 is illustrated in FIG. 3, but the same holds for the other members.

In the fuel tank 13, the forward spar 7, the rear spar 9, the upper skin 3, the lower skin 5, and the ribs 11 may not be formed entirely of CFRP, or may be partially formed of a metal such as an aluminum alloy.

The matrix 17 includes a plastic such as a thermosetting resin, such as an unsaturated polyester or epoxy resin.

Figure 4:
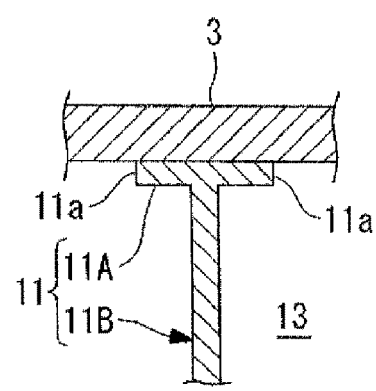
FIG. 4 is a partial longitudinal cross-sectional view of an upper skin and a rib according to the same embodiment cut along line IV-IV in FIG. 2.

The structural members of CFRP of the fuel tank 13 have cut surfaces and the like formed by cutting within the fuel tank 13, in which fuel is stored, and a surface-protective material 18 (see FIG. 5) is applied to the cut surfaces and the like. If, for example, the ribs 11 are each constituted by a flange 11A, a web 11B, and the like, as illustrated in FIG. 4, the surface-protective material 18 is applied to a cut surface 11a at an end of the flange 11A. The surface to which the surface-protective material 18 is applied faces the interior of the fuel tank 13. Apart from cut surfaces formed by cutting, the surface-protective material 18 is applied to other surfaces of the CFRP article, such as bored surfaces, and water jet-machined surfaces.

The surface-protective material 18 is an electrically conductive sealant, primer, coating material, or the like. Various techniques of imparting electrical conductivity to the sealant, primer, coating material, or the like can be applied as the method of imparting the surface-protective material 18 with electrical conductivity, detailed description of which will be omitted in the present specification. One method of imparting the surface-protective material 18 with electrical conductivity is, for example, to use nickel as a filler.

The surface-protective material 18 has a low viscosity. As a result, the surface-protective material 18 is easy to apply, and applied with high bondability to the surface of the CFRP article. In other words, peeling from the surface-protective material 18 from the surface of the CFRP article can be prevented. In order to prevent holidays in the surface-protective material 18 and ensure reliable application, the surface-protective material 18 may be imparted with a color (such as orange) that is different from that of the CFRP article. This allows the presence of the coating of the surface-protective material 18 to be confirmed visually. After being applied to the CFRP article, the surface-protective material 18 is left standing to dry at room temperature for about one week, completing the application process.

Because the surface of the CFRP article is imparted with electrical conductivity by the surface-protective material 18, electrical conduction between the reinforcing materials 15 is ensured even if the surface or the cut surface 11a faces the interior of the fuel tank 13, allowing for the prevention of electrical discharge between the reinforcing materials 15 at the cut surface 11a of the structural member.

In the embodiment, electrical conduction is ensured on the surface of the structural member of CFRP, suppressing the generation of sparks between the ends of the carbon fiber-including reinforcing materials 15 via electrical conduction when a large current flows through the CFRP (such as when struck by lightning), as opposed to techniques in which an anti-static coating material is applied to a surface of a structural member of CFRP as a primer, thereby preventing electrically-induced corrosion while preventing static.

Figure 6:
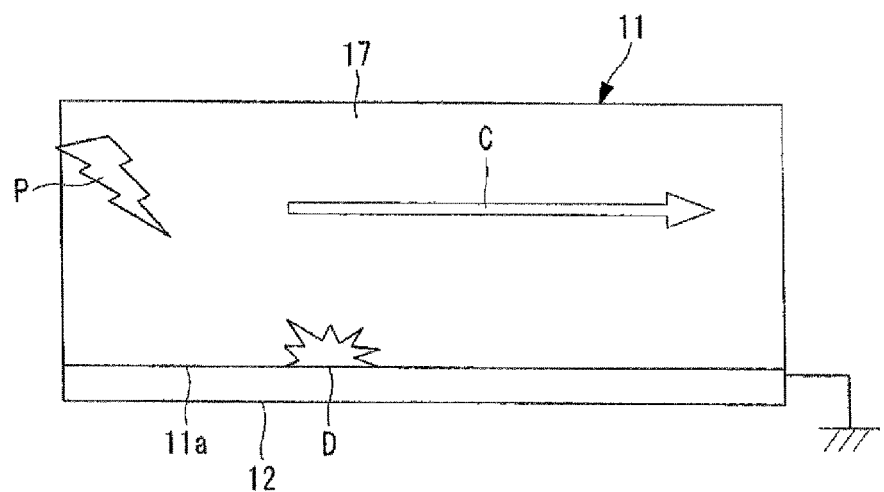
FIG. 6 is a top view of a flange of a conventional rib.

As illustrated in FIG. 6, when lightning strikes a rib 11 of the main wing 1, there is a risk of electrical discharge D occurring between the reinforcing materials 15 at the ends of the reinforcing materials 15 when lightning current C flows from a strike point P through a surface or a cut surface 11a of the CFRP article.

One conventional method of countering such discharge is to apply a sealant 12 or the like to a surface or a cut surface 11a of the CFRP article, sealing sparks generated by electrical discharge within the interior, as illustrated in FIG. 6. However, the sealant 12 must be suitably thick in order to seal in sparks generated by electrical discharge, increasing working time and cost of the process of manufacturing the fuel tank 13. In addition, the thickly applied sealant 12 increases the weight of the main wing 1. In addition, in methods involving the application of sealant 12, strict quality control of the thickness of the sealant 12 is necessary once the predetermined sealant thickness has been obtained in order to yield spark sealing performance. This can greatly increase quality inspection time or costs.

According to the embodiment, by contrast, the surface-protective material 18 applied to the surface or the cut surface 11a of the CFRP article has been imparted with electrical conductivity and is low in viscosity. Because the electrically conductive surface-protective material 18 is applied to the surface or the cut surface 11a, electrical conduction is ensured between the ends of the reinforcing materials 15 present on the surface or the cut surface 11a of the CFRP article, thereby allowing for the prevention of electrical discharge between the ends of the reinforcing materials 15 even if lightning current C flows from a strike point P through a surface or a cut surface 11a of the CFRP article. In addition, because the surface-protective material 18 is low in viscosity, it is easy to apply, and is applied with high bondability to the surface or the cut surface 11a. In addition, because the surface-protective material 18 needs only to ensure electrical conduction between the ends of the reinforcing materials 15, unlike a sealant 12 used to seal in sparks, the thickness can be less than when a sealant 12 is applied, and quality control of the coating thickness can be eased. As a result, working time required for application can be shortened, weight can be reduced, and quality inspection time can also be greatly reduced. All these benefits also allow for reducing costs.

The inventors performed an edge glow evaluation test of the surface-protective material 18 using a surface-protective material A having an electrical conductivity rate of 0.36 $\Omega \cdot cm$ and a curing time of five hours and a surface-protective material B having been imparted with electrical conductivity (although the electrical conductivity rate is unclear) and a curing time of 36 hours. In the edge glow evaluation test, a voltage was applied to test pieces to which the surface-protective materials A, B had been applied, and the current value when sparks began to be generated (spark generation current value) was measured. The greater the spark generation current value is, the more spark generation could be inhibited. The shorter the curing times of the surface-protective materials A, B are, the lower their viscosities are. The spark generation current value was 5 kA for the surface-protective material A and 30 kA for the surface-protective material B. The spark generation current value was high in both cases, yielding the effect of inhibited spark generation.

Next, the results of a lightning resistance test performed upon the test pieces according to the embodiment will be described with reference to FIG. 7. The test method used for the lightning resistance method was to apply a component A waveform current conforming to SAE International ARP5412A (Aircraft Lightning Environment and Related Test Waveforms) to the test pieces via a conducted entry conforming to ARP5416 (Aircraft Lightning Test Methods). Sparks were confirmed using a camera conforming to ARP5416.

Figure 7:
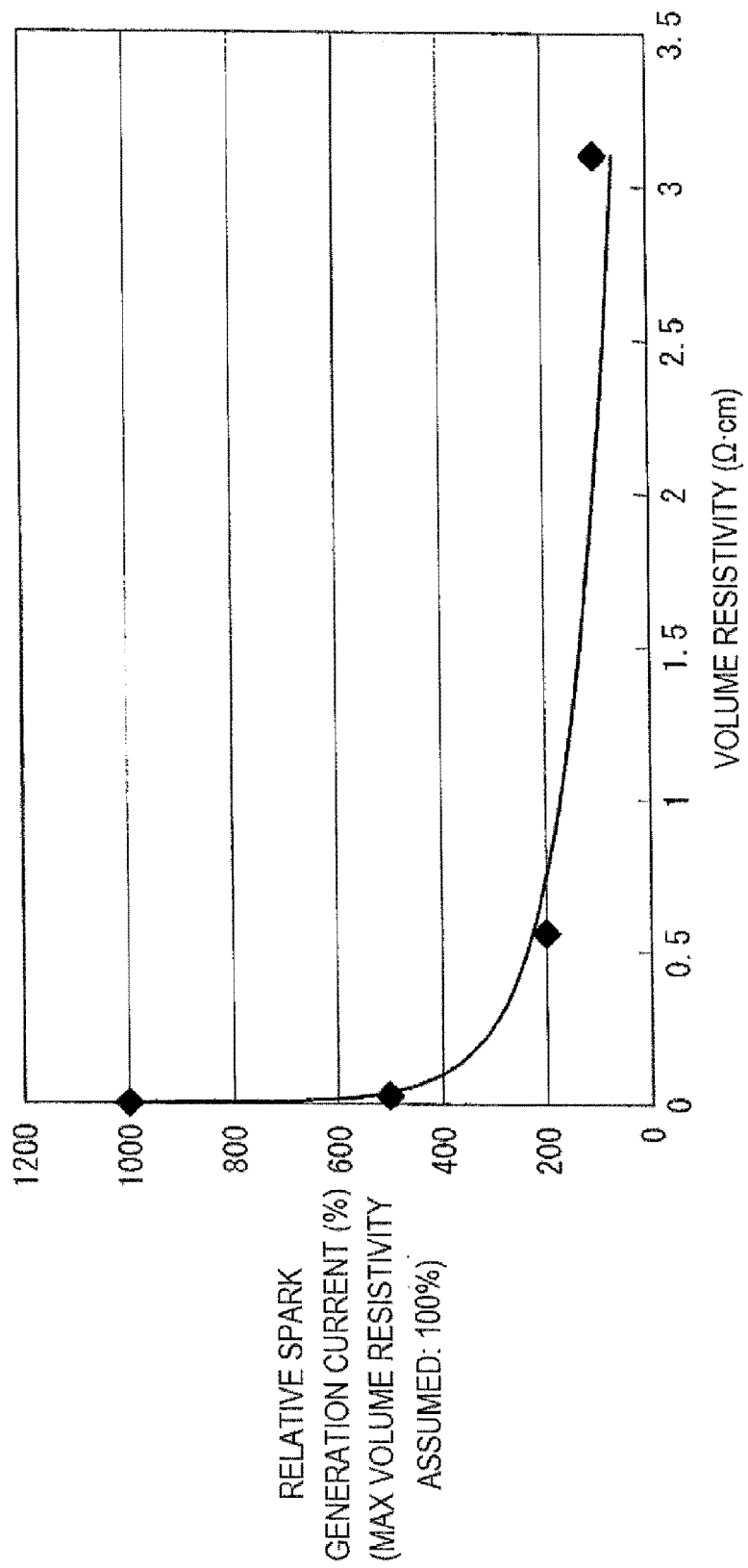
FIG. 7 is a graph showing the relationship between relative spark generation current (%) and the volume resistivity ($\Omega \cdot cm$) of a test piece.

FIG. 7 shows the relationship between relative spark generation current (%) and the volume resistivity ($\Omega \cdot m$) of a test piece. The results shown in FIG. 7 were obtained as the result of performing the lightning resistance test upon a plurality of test pieces of different volume resistivities. In FIG. 7, the spark generation currents of the other test pieces are shown as proportions where 100% indicates the spark generation current value of the test piece out of the plurality of test pieces having the greatest volume resistivity.

As is apparent from the test results, if the volume resistivity is 0.5 Ω·cm or less, the test piece according to the embodiment has a spark generation current approximately twice or more that of a test piece having a volume resistivity of approximately 3 Ω·cm.

In other words, it was confirmed that the test piece according to the embodiment, which had a volume resistivity of 0.5 Ω·cm or less, inhibited spark generation better than a test piece having a higher volume resistivity.

In the embodiment described above, the matrix 17 of the CFRP may have low electrical conductivity, but it is also acceptable to impart the CFRP used in the structural members of the fuel tank 13 with electrical conductivity by imparting the matrix 17 with electrical conductivity.

Various techniques of imparting electrical conductivity to a plastic such as a thermosetting resin or the like may be applied as the method of imparting the matrix 17 with electrical conductivity, detailed description of which will be omitted in the present specification. Methods of imparting the matrix 17 with electrical conductivity include, for example, including electrically conductive particles or fibers in the plastic, or imparting the plastic itself with electrical conductivity. The resistivity of the matrix 17 is, for example, a several Ω·cm.

Figure 5:
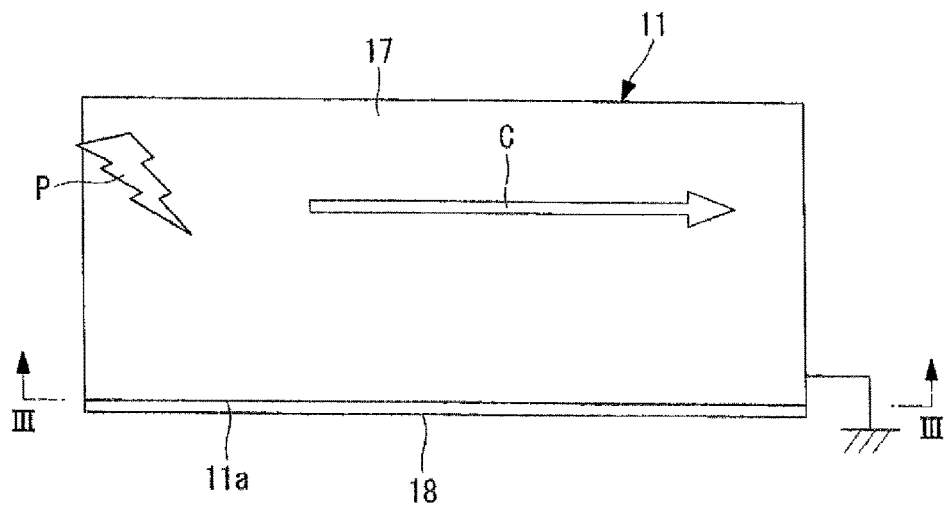
FIG. 5 is a top view illustrating the flange of the rib according to the same embodiment.

Because the matrix 17 has been imparted with electrical conductivity, when lightning strikes a rib 11 of the main wing 1, electricity is conducted between the reinforcing materials 15 when lightning current C flows from a strike point P through a surface or a cut surface 11a of the CFRP article, as illustrated in FIG. 5. As a result, the occurrence of electrical discharge between the reinforcing materials 15 at the cut surface 11a of the CFRP is inhibited.

The structural members of the fuel tank 13 is CFRP in which the reinforcing material 15 includes carbon fibers and the matrix 17 includes a plastic, and to which electrical conductivity has been imparted. Because the matrix 17 has been imparted with electrical conductivity, even if a holiday forms in the surface-protective material 18 described above and the cut surface 11a is exposed to the interior of the fuel tank 13, electrical conduction between the reinforcing materials 15 is ensured, allowing for the prevention of electrical discharge between the reinforcing materials 15 at the cut surface 11a of the structural member.

In the embodiment described above, the structural material for structures is applied, for example, to an aircraft, but the present invention is not limited to this example; for example, the material may be applied to a marine wind turbine, or to a structure of an automobile, railroad car, or the like.

REFERENCE SIGNS LIST

1 Main wing
3 Upper skin
5 Lower skin
7 Forward spar
9 Rear spar
11 Rib(s)
11a Cut surface
11A Flange
11B Web
12 Sealant
13 Fuel tank
15 Reinforcing material
17 Matrix
18 Surface-protective material

The invention claimed is:

1. A fuel tank which has a structural material for structure having carbon-fiber-reinforced plastic, the fuel tank comprising:
   a reinforcing material, included in the carbon-fiber-reinforced plastic, which includes carbon fibers,
   a matrix which includes a plastic, and
   a low-viscosity surface-protective material which is a primer or a coating material imparted with electrical conductivity being applied to a surface of the carbon-fiber-reinforced plastic on which ends of the carbon fibers included in the reinforcing material are exposed to an interior of the fuel tank in which fuel is stored.

2. The fuel tank according to claim 1, wherein the matrix is imparted with electrical conductivity.

3. The fuel tank according to claim 1, having a volume resistivity of 0.5 Ω·cm or less.

4. A main wing, comprising the fuel tank described in claim 1 that constitutes a structure.

5. An aircraft, comprising the main wing described in claim 4.

* * * * *